United States Patent [19]
Curtis et al.

[11] 3,920,435
[45] Nov. 18, 1975

[54] GLASS TUBE BENDING APPARATUS

[75] Inventors: Donald Curtis, Stone, England; Anthony Martin Hooper, Brockville, Canada

[73] Assignee: James A. Jobling & Company Limited, Durham, England

[22] Filed: Sept. 9, 1974

[21] Appl. No.: 504,188

[52] U.S. Cl. ............... 65/281; 65/108; 65/276
[51] Int. Cl.² ............................................ C03B 23/06
[58] Field of Search .............. 65/108, 276, 279, 281

[56] References Cited
UNITED STATES PATENTS
2,080,899  5/1937  Pirani et al. ................... 65/108
FOREIGN PATENTS OR APPLICATIONS
2,010,577  2/1970  France ............................. 65/108

*Primary Examiner*—Arthur D. Kellogg
*Attorney, Agent, or Firm*—Burns, Doane, Swecker & Mathis

[57] ABSTRACT

An apparatus for continuously bending an advancing elongated glass element comprising a frame, guide means supported by the frame to support and guide the advancing element, a heating device disposed in the path of movement of the element to heat it continuously locally as it advances, a carriage displaceably mounted in the frame to move towards and away from the heating device, a shaft mounted in the carriage and rotatable about an axis normal to the direction of movement of the carriage and to the axis of the element, a cam member and a co-operating cam follower member, one of which is rotatable with the shaft to cause displacement of the carriage, a clamp engageable with the element and rotatable by the shaft and power operated means to impart a rotary movement of the shaft at a substantially constant torque, the arrangement being such that as the glass element is softened by the heating device the clamp will be rotated by the drive imparted to the shaft by the power operated means and advance the element and bend it continuously in an arc the radius of which is varied by displacement of the shaft by the cam and follower members.

8 Claims, 5 Drawing Figures

GLASS TUBE BENDING APPARATUS

BACKGROUND OF THE INVENTION

1. Field of the Invention

This invention relates to an apparatus for bending elongated glass elements such as tubes and rods.

2. Description of Prior Art

Previously in the bending of glass tubes it has been necessary to heat the glass locally to its softening point and then to constrain the glass to bend round a former or mandrel. The tube is advanced at a rate of a few feet per hour e.g. 5 feet per hour past a heating device such as a burner or oven and while it is soft it is passed onto a slowly rotating circular wheel-like former or mandrel so that it wraps round it. If the tube is to be bent into a helical coil the former imparts a movement to the glass in the direction of the axis through the former helix coils. If a flat or pancake coil is to be formed, this is frequently carried out by making first a helical coil of cone form, i.e. its coils continuously change in diameter, and then the coil is again heated to softening temperature and flattened. Where a helical coil of small coil diameter is to be formed the softened glass is usually wound round an elongated mandrel.

Such known methods necessitate using expensive machinery and suffer from the disadvantage that the glass by engaging the former or mandrel before it has rehardened on cooling, is rapidly cooled by the cold former, usually of metal, and is liable to crack. Also the softened glass tends to adhere to the mandrel or former and is difficult to remove therefrom: moreover, the engagement of the softened glass with the former or mandrel produces a tendency for the tube to be deformed or at least a tendency to result in blemishes on the glass surface.

The main object of the present invention is to provide an apparatus for bending elongated glass elements such as tubes or rods in which these disadvantages are reduced or minimised and which can be carried out economically.

SUMMARY

According to the present invention an apparatus for continuously bending an advancing elongated glass element such as a tube or rod, comprises a frame, guide means supported by the frame to support and guide the advancing element, a heating device disposed in the path of movement of the element to heat it continuously locally as it advances, a carriage displaceably mounted in the frame to move towards and away from the heating device, a shaft mounted in the carriage and rotatable about an axis normal to the direction of movement of the carriage and to the axis of the element, a cam member and a co-operating cam follower member, one of which is rotatable with the shaft to cause displacement of the carriage, a clamp engageable with the element and rotatable by the shaft and power operated means to impart a rotary movement of the shaft at a substantially constant torque, the arrangement being such that as the glass element is softened by the heating device the clamp will be rotated by the drive imparted to the shaft by the power operated means and advance the element and bend it continuously in an arc the radius of which is varied by displacement of the shaft by the cam and follower members.

In one preferred embodiment the cam is constructed to cause the shaft to rotate the clamp through substantially three quarters of a circle with the shaft stationary and then to displace the carriage through a distance equal to at least the cross sectional dimension of the elongated glass element in the plane of the coil being formed during an angular movement of the clamp through substantially a quarter of a circle to bend the element into a spiral coil.

DESCRIPTION OF PREFERRED EMBODIMENT

Figure 1:
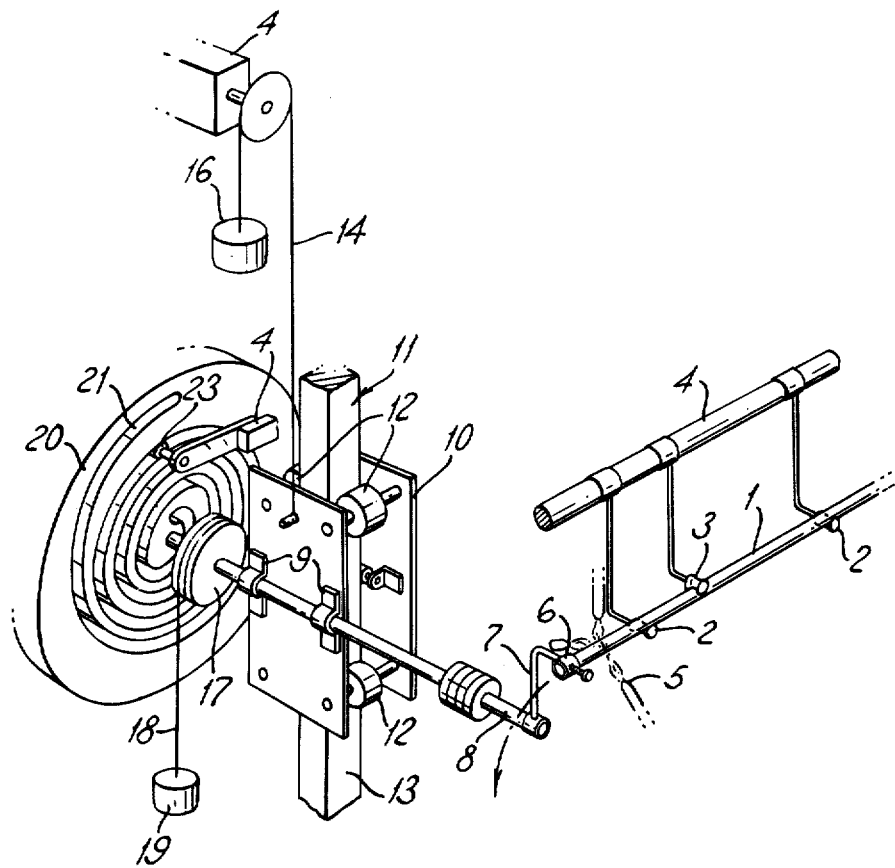
FIG. 1 is a diagrammatic view of an apparatus for bending an elongated glass element such as a tube or rod into a flat spiral of four to six turns.

Referring to FIG. 1 this shows diagrammatically an apparatus for bending an elongated glass element, such as a tube or rod, and in describing the drawings a tube is referred to. A straight glass tube 1, for example of borosilicate glass, to be bent into a coil is located over two spaced lower rollers 2 and an upper roller 3 all of which are rotatably mounted in a frame indicated diagrammatically at 4. The tube is thus held against transverse movement but can move freely longitudinally over the rollers which thus form guide means for the advancing tube.

In the path of the advancing tube, which as will be explained is caused to move in the direction of the arrow A after it has left the rollers, is a heating device 5 in the form of a gas burner ring surrounding the tube from which gas flames impinge on a local area of the tube. The burner is controlled to heat the slowly moving tube e.g. moving at 1–20 ft. per hour, to the point at which it is sufficiently soft to be bent but will harden again in a sufficiently short time to maintain the required bent form. Normally the glass movement being linear it hardens at a speed which for example is comparable to or equal to the speed at which it softens. For borosilicate glass the temperature necessary to produce this effect is in the range of 550°C to 650°C.

The glass tube end, having been fed in the guides past the burner, in setting up the apparatus for a bending operation, is secured in a clamp, shown as a ring clamp 6, which is mounted on the end of a crank arm 7 fixed at its other end to a rotary shaft 8.

The shaft 8 is journalled in bearings 9 in a carriage 10 which can rise and fall on a guide 11 forming part of the frame 4. The carriage has rotatable rollers 12 which engage the vertical faces 13 of the guide to ensure smooth movement of the carriage up and down the guide. A flexible cable or rope 14 is secured to the carriage and passes up over a pulley 15 rotating on a fixed pivot pin secured with respect to the frame 4. The free end of the cable or rope extends downwardly from the pulley and has a weight 16 suspended on it, and which acts to urge the carriage upwardly on the guide 11.

On the end of the shaft 8 remote from the arm 7 is secured a drum 17, which may be of glass or plastics material for example, round which is coiled a flexible cord 18, e.g. of nylon, on the free end of which is suspended a weight 19, which is of sufficient weight to cause the shaft 8 and arm 7 to rotate when the glass of the tube 1 softens sufficiently to yield.

On the shaft 8 beyond the drum 17 is secured a disc 20 e.g. of metal or hardboard on which is fixed a cam member in the form of a track 21.

The cam track 21 may be a coiled element of metal or rigid plastics material for example having the configuration of the coil to be formed from the tube 1. The track 21 may stand proud of the disc 20 or it may be formed as a groove in the disc or a plate fixed to the disc. On the frame 4 is fixed a support 22 on which is journalled a cam follower member in the form of a freely rotatable roller 23 which has at least a portion in rolling engagement with the track 21 and due to the action of the weight 16 this is urged into permanent engagement with the track 21.

Figure 2:
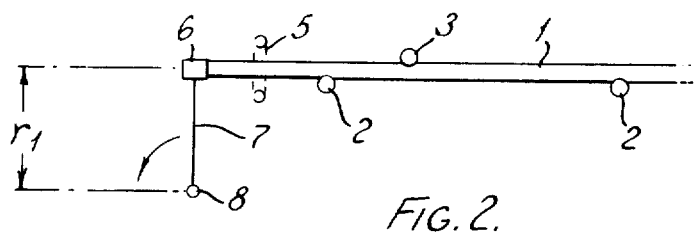
FIGS. 2 to 5 show stages in the bending of the glass element as a coil thereof is produced in one form of apparatus.

Referring to FIGS. 2 to 5, these show diagrammatically one form of operation of bending the tube 1 using the apparatus of FIG. 1. FIG. 2 shows the tube 1 in the guide rollers 2, 3 with its end extending through and beyond the burner 5 and secured in the clamp 6 with the arm 7 rising substantially vertically from the shaft 8. It will be observed that the length of the arm 7 is $r_1$ which is the radius of the innermost turn of the coil to be formed from the element 1.

The apparatus is then set in operation by igniting the gas jets 24 (FIG. 3) of the burner 5. The weight 19 is urging the shaft 8 and the arm 7 to rotate anti clockwise in FIG. 1, and as the glass softens at the burner it begins to bend under the force of the weight 19 due to rotation of the shaft 8 and arm 7. The tube is thus pulled slowly e.g. at 1 to 20 ft/hr through the rollers 2, 3 and burner 5 so that successive portions of tube are heated to softening temperature by the burner as the arm 7 rotates.

Figure 3:
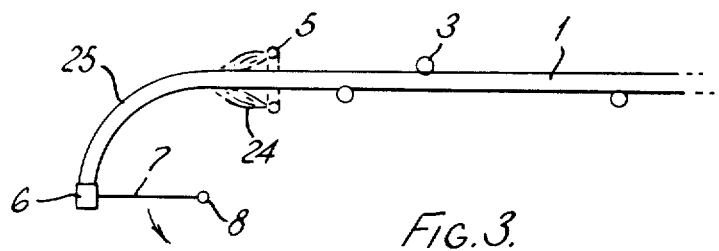
Figure 4:
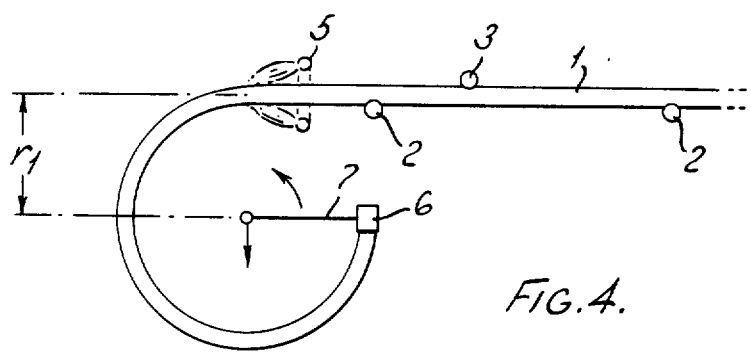
Figure 5:
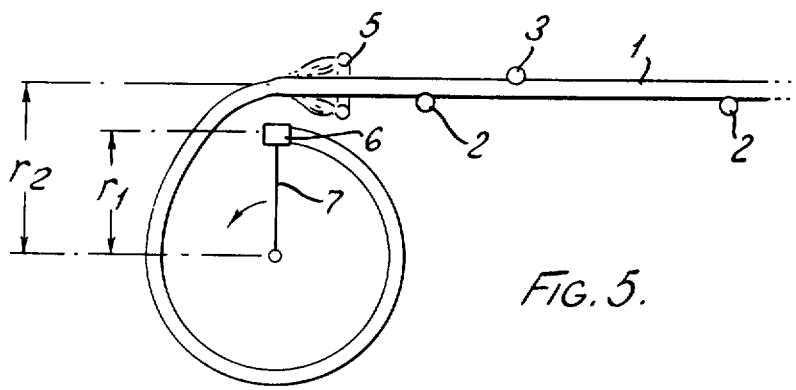

FIG. 3 shows the position of the tube after the arm 7 has rotated through 90° imparting to the end of the tube a substantially circular arc 25. The rotating of the arm 7 continues until the arm has moved through about 270° as seen in FIG. 4. The tube end then has three quarters of the first turn of a coil and is of substantially equal radius. In this particular operation the cam track 21 is circular to this point, but thereafter for the next 90° of rotation of the shaft 8 the radius of the cam track 21 increases steadily to a radius equal to $r_1$ plus at least a length equal to the diameter of the tube. This change in cam track radius causes the follower member or roller 23 to force the cam track downwardly and thus the carriage 10 with the shaft 8 are displaced downwardly on the guide 11 so that the radius of the bend in the tube 1 increases as seen in FIG. 5. This method of operation continues until the follower roller 23 reaches the end of the track 21 when the coiled tube of the requisite number of turns of varying radius is formed. The gas to the burner 5 is then turned off and the tube cools below the softening point and the coil can then be separated in a conventional manner from the remainder of the unbent portion of the tube 1.

If it is desired to form the coil in the form of a helix then all that is necessary is to mount the guide 11 on a carriage displaceable in the frame 4 which can move axially of the shaft 8 under the action of a prime mover such as a weight similar to the weight 16.

It will be understood that it is necessary to control the flames of the burner to ensure the correct degree of heating of the tube 1. Alternatively the heating device may be a heated oven over the tube 1.

While the process hereinbefore described shows the first 270° of the first turn of the coil to be of constant radius, the carriage 10 may be continuously displaced, depending on the configuration of the track 21 so that the coil formed has a uniformly increasing radius in each turn.

For initial clamping purposes it may be desirable to bend the free end of the tube 1 through 90° from the axis through the straight part of the tube so that as the coil is formed from the tube 1 the clamp does not interfere with the tube coiled after the first revolution of the arm 7.

To improve the sensitivity of the whole mechanism a vibrator of conventional construction may be used to ensure that the bending operation continues smoothly and the moving parts do not halt due to frictional forces.

The burner flames 24 (FIG. 3) are directed along the tube as shown so as to touch the tube rather than impinge directly onto the tube. The outer radius of the bend is heated more than the inner radius since the outer radius requires greater deformation of the tube.

It will be seen that by the apparatus of the invention the tube 1 is bent into a coil of predetermined configuration without the use of a former or mandrel with which it would engage and the whole apparatus is simple in construction and to operate so that the operation is simple and economic to carry out.

I claim:

1. An apparatus for continuously bending an advancing glass element comprising a frame, guide means supported by said frame to support and guide said advancing element, a heating device disposed in the path of movement of said element to heat it continuously locally as it advances with respect to said guide means, a carriage displaceably mounted with respect to said frame to move towards and away from said heating device, a shaft mounted in said carriage and rotatable about an axis normal to the direction of movement of said carriage and to the axis of said element, a cam member and a cooperating cam follower member, one of said members being rotatable with said shaft to cause displacement of said carriage, a clamp engageable with said element and rotatable by said shaft, and power operated means to rotate said shaft at a substantially constant torque, whereby as said glass element is softened by said heating device said clamp is rotated to advance said element past said heating device in an arc the radius of which is varied by displacement of said carriage.

2. An apparatus according to claim 1 wherein said cam member is profiled to cause said clamp to rotate through substantially 270° at constant radius with said carriage stationary and then to displace said shaft during the next 90° angular movement thereof through a distance equal to at least the cross sectional dimension of said glass element in the plane of the coil being formed to bend said element into a spiral.

3. An apparatus according to claim 1 wherein means are provided to feed said glass element in a linear direction to said bending means.

4. An apparatus according to claim 1 wherein said clamp is mounted at the end of an eccentric device fixed to said shaft.

5. An apparatus according to claim 1 wherein a drum is mounted on said shaft and said prime mover is drivingly connected to said drum.

6. An apparatus according to claim 1 wherein said cam member has a cam track with a configuration similar to that of the coil to be formed from said element.

7. An apparatus according to claim 1 wherein said carriage runs along a guide and said guide is mounted for movement with respect to said frame in a direction normal to the plate in which said clamp rotates to bend said element into a helix.

8. Apparatus for continuously bending an advancing glass element comprising:
- guide means for supporting and guiding said advancing element;
- heating means disposed in the path of movement of said element to heat it continuously locally as it advances with respect to said guide means;
- clamp means engagable with said element;
- shaft means, operably connected to said clamp means and rotatable about an axis orthogonal to the direction of advance of said element, for rotating said clamp means to:
- advance said element past said heating means, and enforce free arcuate bending of said element in response to rotation of and position of said shaft means and clamp means;
- movable carriage means for controlling the position of shaft means and said clamp means operably connected thereto;
- cam and follower means for controlling movement of said carriage means in a direction generally orthogonal to both said axis of shaft means rotation and said direction of advance of said element;
- said cam and follower means including a member rotatable with shaft means and being operable during and in response to rotation of said shaft means to control the curve imparted to said element.

* * * * *